March 18, 1941.  H. H. PARKER  2,235,082
ARTICLE MADE FROM RAYON
Filed Dec. 7, 1937
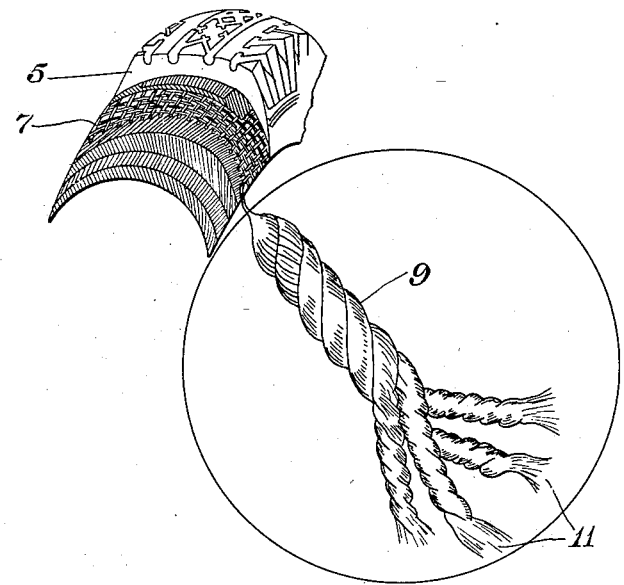
Harold Henry Parker INVENTOR.
BY *[signature]*
ATTORNEY Patented Mar. 18, 1941

2,235,082

UNITED STATES PATENT OFFICE 2,235,082

ARTICLE MADE FROM RAYON

Harold Henry Parker, Kenmore, N. Y., assignor to E. I. du Pont de Nemours & Company, Wilmington, Del., a corporation of Delaware Application December 7, 1937, Serial No. 178,531

23 Claims. (Cl. 57—140)

This invention relates to yarn or thread composed of artificial fibers, and relates particularly to the preparation of twisted cord structures from strong rayon of the regenerated cellulose type, and to their use in the manufacture of reinforced rubber articles, such as rubber vehicle tires.

This application is a continuation-in-part of my copending application, Serial No. 731,719, filed June 21, 1934.

Strong rayon cords previously suggested for use in the reinforcing of rubber articles; e. g., rubber tires, have in general been built up from relatively small denier thread such as 275 denier thread, having a twist of about 7 turns per inch, by plying 5 of these threads together to form a strand and then again plying three of the said strands to form a cord. This cord construction involves several costly twisting operations.

It is an object of the present invention to produce new and improved plied cord structures directly from high tenacity rayon. A further object of the invention pertains to the manufacture of such plied cord structures by an efficient and economical procedure. Another object of the invention relates to rubber articles reinforced with the novel plied strong rayon cord structure. Other objects will appear hereinafter.

The objects of the invention are in general obtained by twisting several threads of comparatively heavy denier; e. g., 500 denier or more, in a single plying operation to form a cord which may readily be utilized as a reinforcing material for rubber articles. This procedure involves the use of a single plying operation as compared with the multiple plying operations previously known to the art.

Heretofore, in the preparation of rayon cords composed of 275 denier yarn, it was common practice to twist the rayon thread only a small amount, such as seven turns per inch, and depend on high strand and/or high cord twist to give the required elasticity and elongation to the yarn. According to the procedure of the present invention, however, the desired characteristics may be obtained by imparting to the elemental thread a relatively high predetermined degree of twist, and by imparting to the cord a suitable amount of twist in the plying operation.

In order to obtain a cord with a single plying operation, which has particularly desirable physical characteristics, the twist imparted to the elemental heavy denier thread should comprise a larger number of turns per inch than the twist, in turns per inch, imparted to the cord during the plying operation. On the other hand, the twist imparted to the cord during the plying operation should be, as measured by helix angle, at least as great, and preferably greater than that initially imparted to the elemental thread. Preferably the twist, measured by helix angle, imparted to the cord should be at least 26° whereas the twist imparted to the elemental thread may be somewhat less.

The accompanying drawing diagrammatically illustrates the construction of a reinforced rubber product in accordance with the present invention. Reference numeral 5 generally designates a portion of a tire carcass. The tire carcass is reinforced with fabric 7 constructed of a plied cord structure 9. The plied cord structure is illustrated by a magnified section of the drawing and is made in a single plying operation and is composed of several threads 11 having a denier of 500 or more.

It is furthermore to be understood that the twist, in turns per inch, may vary considerably with respect to the denier of the yarn. Whether a twist is a high twist or a low twist depends upon the "helix angle" as explained by the article, "An introduction to the micro-analysis of yarn twist," by E. R. Schwartz, published in the Journal of the Textile Institute for March, 1933. A 100 denier thread having about 60 turns per inch has about the same degree of twist as a 1660 denier thread having about 20 turns per inch.

To more clearly illustrate the invention, the following examples are given, these examples being intended to be illustrative and not limitative. The helix angles set forth in these examples have been measured by the method given in the above-mentioned article.

Example I

Three threads of 1375 denier containing 600 filaments each, are individually twisted to 20 turns per inch right. The three threads thus individually twisted are plied together with twisting to 10 turns per inch left to form a cord. The resulting cord is found to be admirably suited as a reinforcing material in pneumatic rubber tires and in other rubber articles. The physical properties of this cord, on a unit denier basis, are substantially the same as cords made from 275 denier thread in two doubling and twisting operations to obtain, for example, the 275-5-3 construction; i. e., comprising five 275 denier threads twisted to form a strand with 20 turns per inch right, three of the strands being twisted with 10 turns per inch left to form the cord. Additionally, the cord of this example has the required elasticity to give satisfactory performance in automobile tires. Additionally, when subjected to a fatigue test, a loss in strength of only 7.8% is exhibited by the cord of this example whereas a loss in strength of 13% has been recorded for standard Sak cotton cord formerly used as a reinforcing material for tires, both samples being tested under identical conditions.

*Example II*

Thread of 500 denier containing 200 filaments and having a strength of about 3 grams per denier is twisted to 25 turns per inch, or so the helix angle of the filaments with respect to the thread is about 20°. Two threads so twisted are doubled and twisted together in the reverse direction to 21 turns per inch, the helix angle of the thread with respect to the cord being 33°. The cord thus prepared is of good strength and elasticity and is useful as the reinforcing material for rubber goods of any description such as tires, steam hose, belting and the like.

*Example III*

Two 2200 denier-960 filament threads having a strength of about 3 grams per denier and twisted to 9.6 turns per inch (a helix angle of about 26°), are combined by twisting in the direction opposite to the thread to 7.8 turns per inch (a helix angle of about 32°) to form a cord. This cord has an exceptional, high strength being about 2¼ grams per denier, excellent elasticity and high fatigue value and is admirably suited as the reinforcing material for rubber tires.

*Example IV*

Three 1100 denier-480 filament threads having a strength of about 3 grams per denier and twisted to 10 turns per inch, are plied together with a twist of 10 turns in the direction opposite to the twist of the thread to form a cord.

*Example V*

Three 1100 denier-480 filament threads having a strength of about 3 grams per denier and twisted to 16.5 turns per inch are plied together to form a cord with a twist of 10 turns per inch in the direction opposite to the twist of the thread. In this case the helix angle of the filaments with respect to the thread prior to the plying step is 32° as is also the helix angle of the thread with respect to the cord finally produced. This cord also has excellent strength, being over 2 grams per denier.

*Example VI*

Two 1100 denier-480 filament threads having a strength of about 3 grams per denier and twisted to 16.2 turns per inch (a helix angle of 28°) are combined to form a cord by twisting in the direction opposite to the thread twist to 14.6 turns per inch (a helix angle of the thread with respect to the cord of about 32°).

*Example VII*

Two threads of 1650 denier containing 720 filaments and twisted to 15.7 turns per inch (a helix angle of about 30°) are combined to form a cord by twisting them together in the direction opposite to the thread twist to 10.5 turns per inch (a helix angle of about 33°).

*Example VIII*

Two threads of 900 denier-400 filament yarn twisted to 18.8 turns per inch (a helix angle of about 17°) are combined to form a cord by twisting them together in the direction opposite to the thread twist to 16.4 turns per inch (a helix angle of about 33°).

The cords prepared in the manner described in Examples III to VIII inclusive all have suitable characteristics for use in the production of automobile tires.

It is to be understood that the twisting may be carried out in a single step or in two or three or more steps if desired, whether twisting the filaments in the elemental thread or twisting the several threads together to form the cord.

There are numerous thread sizes that can be used to advantage in making up a simple plied thread of the type previously discussed. The size of the thread may be as little as 500 denier or as big as 2,000 denier or even more. A cord structure may be prepared, for instance, by plying two, three, four or more threads, depending upon the denier of the thread, together. In any of these constructions, any desired degree of twist may be used although it is of course preferred that the number of turns per inch imparted to the cord be not greater than the number of turns imparted to the elemental thread, and additionally, it is preferred that the degree of twist as measured by the helix angle be not less in the cord than in the thread. Both the cord and the thread may be twisted to a high degree of twist, that is to say, to a twist exhibiting a helix angle as great as 33°.

The term "strong rayon," wherever used throughout the specification and claims, is intended to define rayon having a dry tenacity at room temperature (70° F.) and 60% relative humidity of at least 2.5 grams per denier.

The terms "yarn" and "thread" used in this specification are intended to be synonymous.

Threads produced in accordance with the above description and examples are comparable in physical characteristics and utility to cords previously known, with the elimination of at least one costly plying and twisting operation.

Preferably, the initial or elemental thread twisting exceeds the cord twist by at least 50% and may even exceed the cord twist by as much as 100% or more. By this procedure, it is possible to obtain cord having a high degree of elasticity and elongation and of such characteristics as conform to the specifications of the rubber tire industry.

The invention in its preferred form comprises the making of plied structures from regenerated cellulose threads made by the viscose process. It is to be understood, however, that regenerated cellulose threads made by other processes, e. g., the cuprammonium cellulose process, cellulose acetate threads, and other forms of artificial cellulose threads having a tenacity above 2.5 grams per denier at room temperature, when dry, may be used with advantage.

Any variation or modification which conforms to the spirit of the invention is intended to be included within the scope of the claims.

I claim:

1. A plied cord structure for reinforcing rubber structure comprising strong rayon threads having a denier in excess of 500, constructed by a single plying operation, the singles twist in turns per inch being not less than the cord twist.

2. A plied cord structure for reinforcing rubber structures comprising strong rayon threads having a denier in excess of 500, constructed by a single plying operation, the singles twist in turns per inch being not less than the cord twist, and the cord twist, as measured by helix angle, being at least as great as the singles twist.

3. A plied cord structure for reinforcing rubber structures comprising strong rayon threads having a denier in excess of 500, constructed by a single plying operation, the twist, in turns per inch, imparted to the elemental thread exceeding the twist imparted by the plying operation.

4. A rubber structure comprising a plied cord structure comprising strong rayon threads having a denier in excess of 500, constructed by a single plying operation.

5. A rubber structure comprising a plied cord structure comprising strong rayon threads having a denier in excess of 500, constructed by a single plying operation, the twist, in turns per inch, imparted to the elemental thread being not less than the twist imparted by the plying operation.

6. A rubber structure comprising a plied cord structure comprising strong rayon threads having a denier in excess of 500, constructed by a single plying operation, the twist, in turns per inch, imparted to the elemental thread being not less than the twist imparted by the plying operation, and the cord twist, as measured by helix angle, being at least as great as the singles twist.

7. A plied cord structure for reinforcing rubber structures as defined by claim 2 in which the cord twist, as measured by helix angle, is at least 26°.

8. A rubber structure comprising a plied cord structure as defined in claim 6 in which the cord twist, as measured by helix angle, is at least 26°.

9. A cord for reinforcing rubber structures comprising multifilament strong rayon yarns of substantially parallel filaments, each yarn being in excess of 1000 denier and twisted to about 15 turns per inch in one direction, three such yarns being plied to about 10 turns per inch in the opposite direction to form a cord.

10. A cord for tires and the like comprising multifilament rayon yarns of substantially parallel filaments, each yarn being of abnormally large denier, such as 500 to 1500 denier or more, and each yarn having a twist in one direction, a plurality of such yarns being plied together with a twist per unit length in a direction opposite to and substantially equal to or less than said yarn twist per unit length.

11. A cord for reinforcing rubber structures which comprises a plurality of multifilament strong rayon yarns plied together, each yarn being of a denier in excess of 500 and having a twist in one direction prior to plying, and the plurality of yarns being plied together with a twist in the opposite direction to form the cord, the yarn twist being at least equal to the plying twist, said yarn and plying twists being such as to give a balanced cord, and the number of yarns constituting the cord depending on the denier of said yarns.

12. A cord for reinforcing rubber structures which comprises a plurality of multifilament strong rayon yarns plied together, each yarn being of a denier in excess of 500 and having a twist in one direction prior to plying, and the plurality of yarns being plied together with a twist in the opposite direction to form the cord, the yarn twist being from 50% to 100% greater than the plying twist, said yarn and plying twists being such as to give a balanced cord, and the number of yarns constituting the cord depending on the denier of said yarns.

13. A cord for reinforcing rubber structures which comprises a plurality of multifilament strong rayon yarns plied together, each yarn being of a denier in excess of 500 and twisted to from about 10 to about 25 turns per inch in one direction prior to plying, and the plurality of yarns being plied together with a twist in the opposite direction to form the cord, the yarn twist being greater than the plying twist, said yarn and plying twists being such as to give a balanced cord, and the number of yarns constituting the cord depending on the denier of said yarns.

14. A cord for tires and the like comprising multifilament rayon yarns of substantially parallel filaments, each yarn being in excess of 1000 denier and twisted to a range of 16 to about 24 turns per inch in one direction, a plurality of such yarns being plied together in the opposite direction with the ply twist less than said yarn twist.

15. A cord for tires and the like comprising multifilament rayon yarns of substantially parallel filaments, each yarn being in excess of 1000 denier and twisted to a range of from 16 to about 24 turns per inch in one direction, a plurality of such yarns being plied together in the opposite direction with the ply twist of from about 5 to 10 turns to the inch.

16. A cord for reinforcing rubber structures which comprises a plurality of strong rayon yarns plied together, each yarn consisting of continuous multifilaments and being in excess of 500 denier, each yarn having a primary twist in one direction prior to plying, and the plurality of yarns being assembled together with a secondary twist in the opposite direction to form the cord, said primary twist being not less than said secondary twist.

17. A cord for reinforcing rubber structures which comprises a plurality of strong rayon yarns plied together, each yarn consisting of continuous multifilaments and being in excess of 500 denier, each yarn having a primary twist in one direction prior to plying, and the plurality of yarns being assembled together with a secondary twist in the opposite direction to form the cord, said primary twist being not less than said secondary twist and being at least about 10 turns per inch.

18. A cord for reinforcing rubber structures which comprises a plurality of strong rayon yarns plied together, each yarn consisting of continuous multifilaments and being in excess of 500 denier, each yarn having a primary twist in one direction prior to plying, and the plurality of yarns being assembled together with a secondary twist in the opposite direction to form the cord, said primary twist being not less than said secondary twist and being at least about 10 to 15 turns per inch.

19. The method of producing a cord for reinforcing rubber structures which comprises twisting a continuous multifilament strong rayon yarn of a denier in excess of 500 in one direction, and thereafter plying together by twisting a plurality of the twisted yarns in a direction opposite to the twist imparted to the yarn to produce the cord, the twist imparted to the yarn being not less than the twist imparted to the cord.

20. The method of producing a cord for reinforcing rubber structures which comprises twisting a continuous multifilament strong rayon yarn of a denier in excess of 500 in one direction, and thereafter plying together by twisting a plurality of the twisted yarns in a direction opposite to the twist imparted to the yarn to produce the cord, the twist imparted to the yarn being at least about 10 turns per inch and not less than the twist imparted to the cord.

21. The method of producing a cord for reinforcing rubber structures which comprises twisting a continuous multifilament strong rayon yarn of a denier in excess of 500 in one direction, and thereafter plying together by twisting a plurality of the twisted yarns in a direction opposite to the twist imparted to the yarn to produce the cord, the twist imparted to the yarn being from about 10 to 15 turns per inch and not less than the twist imparted to the cord.

22. A cord for reinforcing rubber structures which consists essentially of two strong rayon yarns plied together, each yarn consisting of continuous multifilaments and being in excess of 500 denier, each yarn having a primary twist in one direction prior to plying, and the two yarns being assembled together with a secondary twist in the opposite direction to form the cord, said primary twist being not less than said secondary twist.

23. A cord for reinforcing rubber structures which consists essentially of two strong rayon yarns plied together, each yarn consisting of continuous multifilaments and being in excess of 500 denier, each yarn having a primary twist in one direction prior to plying, and the two yarns being assembled together with a secondary twist in the opposite direction to form the cord, the combined primary and secondary twist being within the range of approximately 15½ to 35 turns per inch and the secondary twist being less than the primary twist.

HAROLD HENRY PARKER.

CERTIFICATE OF CORRECTION.

Patent No. 2,235,082. March 18, 1941.

HAROLD HENRY PARKER.

It is hereby certified that error appears in the printed specification of the above numbered patent requiring correction as follows: Page 2, second column, line 72, claim 2, for "piled" read --plied--; and that the said Letters Patent should be read with this correction therein that the same may conform to the record of the case in the Patent Office.

Signed and sealed this 15th day of April, A. D. 1941.

(Seal)

Henry Van Arsdale,
Acting Commissioner of Patents.